United States Patent [19]

Nagase et al.

[11] Patent Number: 4,611,158

[45] Date of Patent: Sep. 9, 1986

[54] METHOD AND APPARATUS FOR CONTROLLING PWM INVERTER

[75] Inventors: Hiroshi Nagase; Yasuo Matsuda, both of Hitachi; Hisakazu Ninomiya, Funabashi, all of Japan

[73] Assignee: Hitachi, Ltd., Tokyo, Japan

[21] Appl. No.: 583,696

[22] Filed: Feb. 27, 1984

[30] Foreign Application Priority Data

Feb. 28, 1983 [JP] Japan .................................. 58-33230
Dec. 5, 1983 [JP] Japan ................................ 58-228431

[51] Int. Cl.$^4$ .............................................. H02P 5/40
[52] U.S. Cl. .................................... 318/803; 318/811; 318/798
[58] Field of Search ........................ 318/803, 807–811, 318/798, 806

[56] References Cited

U.S. PATENT DOCUMENTS

| | | | |
|---|---|---|---|
| 3,859,585 | 1/1975 | Meier ..................................... | 363/41 |
| 4,240,020 | 12/1980 | Okuyama et al. .................... | 318/811 |
| 4,322,671 | 3/1982 | Kawada et al. ...................... | 318/811 |
| 4,354,223 | 10/1982 | Turnbull .............................. | 318/811 |
| 4,364,109 | 12/1982 | Okado et al. ......................... | 318/811 |
| 4,387,421 | 6/1983 | Zach et al. ............................ | 318/811 |
| 4,409,534 | 10/1983 | Bose ...................................... | 318/811 |
| 4,458,192 | 7/1984 | Sakamoto et al. ................... | 318/811 |

FOREIGN PATENT DOCUMENTS 1315188 4/1973 United Kingdom .

Primary Examiner—David Smith, Jr.
Attorney, Agent, or Firm—Antonelli, Terry & Wands

[57] ABSTRACT

An AC motor such as an induction motor or a synchronous motor is driven by a PWM inverter. Turn-on of the PWM inverter is controlled by PWM pulse signals obtained as a result of comparison between voltage command signals (a modulation signal) and a carrier wave signal. The voltage command signals are obtained as a function of errors between current command signals and detected current signals. Ripples included in the voltage command signals are so suppressed as to be decreased as the rotation speed of the AC motor becomes lower. By so suppressing the ripples, the level of noise generated from the motor can be reduced especially when the motor operates in a low-speed rotation range.

19 Claims, 26 Drawing Figures

F I G. 5a
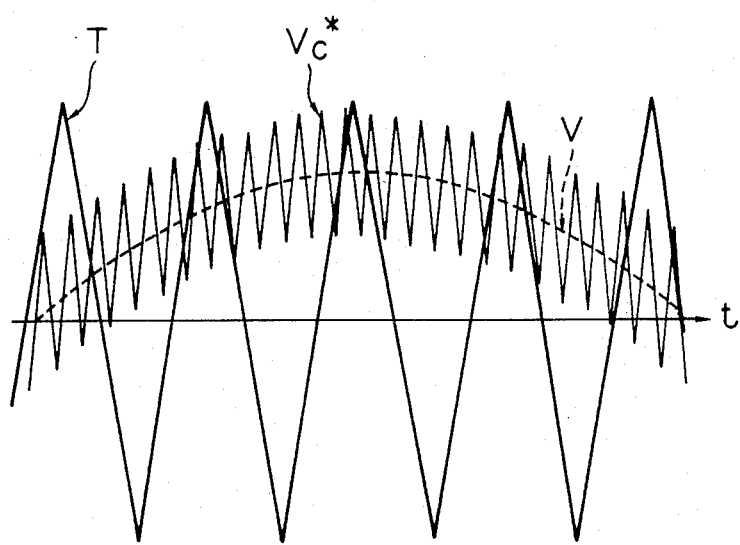
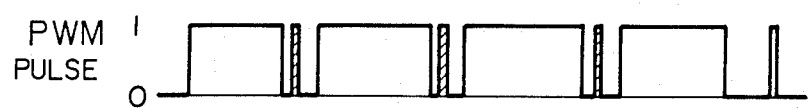

F I G. 13
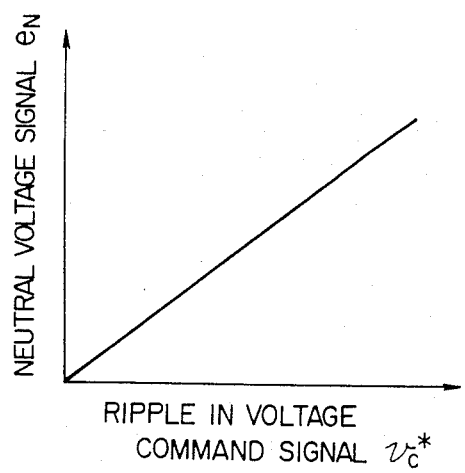

METHOD AND APPARATUS FOR CONTROLLING PWM INVERTER

This invention relates to a method and apparatus for controlling a PWM (pulse width modulation) inverter.

A PWM inverter is used to drive an AC motor such as an induction motor or a synchronous motor. Turn-on control of the PWM inverter is made by a PWM pulse signal obtained as a result of comparison between a modulation signal and a carrier wave signal. When the PWM inverter drives an AC motor, a voltage command signal (a sinusoidal wave signal) whose amplitude is variable depending on the error between a current command signal commanding the current of the PWM inverter in each phase and a detected current signal indicative of the detected current of the PWM inverter in each phase is applied as the modulation signal for each phase. The current command signals are each in the form of a sinusoidal wave signal whose amplitude is variable in proportion to the error between a speed command signal commanding the speed of the AC motor and a detected speed signal indicative of the detected speed of the AC motor.

It is commonly known that an AC motor driven by a PWM inverter generates magnetic noise (acoustic sound). Such magnetic noise is generated from the AC motor for the reason that higher harmonic components are included in the output currents of the PWM inverter. The higher the response of the speed control system for the AC motor, the level of magnetic noise is higher, and, especially, the magnetic noise gives an operator a feeling of discomfort when the level of mechanical noise is low as when the AC motor is under rotation in its low-speed range.

On the other hand, such an AC motor is now frequently installed not only in a place of high noise level but also in a place of low noise level. Even when an AC motor driven by a PWM inverter is installed in a place of high noise level, generation of noise giving a feeling of discomfort is not desirable in view of the working circumstance. It is therefore strongly demanded to reduce the undesirable magnetic noise generated from the AC motor driven by the PWM inverter.

Various methods have been proposed hitherto for reducing the magnetic noise generated from an induction motor driven by a PWM inverter. In one of the known methods, the magnitude of the exciting current component of the primary current is reduced in a light-loaded operating condition of the induction motor thereby varying the amount of magnetic flux produced in the induction motor. This method is described in, for example, copending U.S. patent applications No. 528,419 filed Aug. 31, 1983, entitled "Method and Apparatus for controlling PWM Inverter" and No. 530,101 filed Sept. 7, 1983, entitled "Control Apparatus for AC Motors" and also in Japanese Patent Application Laid-open No. 56-83284 (1981) entitled "Apparatus for variable-speed operation of induction motor".

However, the method of the Japanese Laid-open application is defective in that magnetic noise cannot be reduced in the rated-load operating condition of the motor when the magnetic flux density attains its rating, although such magnetic noise can successfully be reduced in the no-loaded or light-loaded operating condition of the motor.

With a view to obviate the prior art defect pointed out above, it is a primary object of the present invention to provide a method and apparatus for controlling a PWM inverter, which can reduce undesirable magnetic noise generated from an AC motor driven by the PWM inverter regardless of the loaded condition of the AC motor and which can ensure a high-response speed control.

In accordance with one aspect of the present invention, there is provided a method for controlling a PWM inverter which drives an AC motor and in which a voltage command signal whose amplitude is variable depending on the error between a current command signal and a detected current signal in each of the individual phases is used as a modulation signal, and, for each phase, this modulation signal is compared with a carrier wave signal to provide a PWM pulse signal controlling the PWM inverter, the method comprising suppressing ripples included in the voltage command signal in each phase so as to decrease the amplitude of the ripples with the decrease of the rotation speed of the AC motor.

In accordance with another aspect of the present invention, there is provided an apparatus for controlling a PWM inverter comprising a PWM inverter driving an AC motor, a current control circuit generating a voltage command signal whose amplitude is variable depending on the error between a current command signal commanding the current of the PWM inverter and a detected current signal indicative of the detected current of the PWM inverter in each of the individual phases, pulse generating means receiving the voltage command signal as a modulation signal and generating a PWM pulse signal controlling the PWM converter as a result of comparison between the modulation signal and a carrier wave signal for each phase, and ripple suppressing means for decreasing the amplitude of ripples included in the voltage command signal in each phase with the decrease of the rotation speed of the AC motor.

Other objects, features and advantages of the present invention will become apparent from the following detailed description of preferred embodiments thereof taken in conjunction with the accompanying drawings, in which:

FIGS. 5a and 5b are waveform diagrams illustrating the operation of the embodiment shown in FIG. 1;

FIG. 13 is a graph showing the relation between the neutral voltage and ripples included in the voltage command signal;

Figure 1:
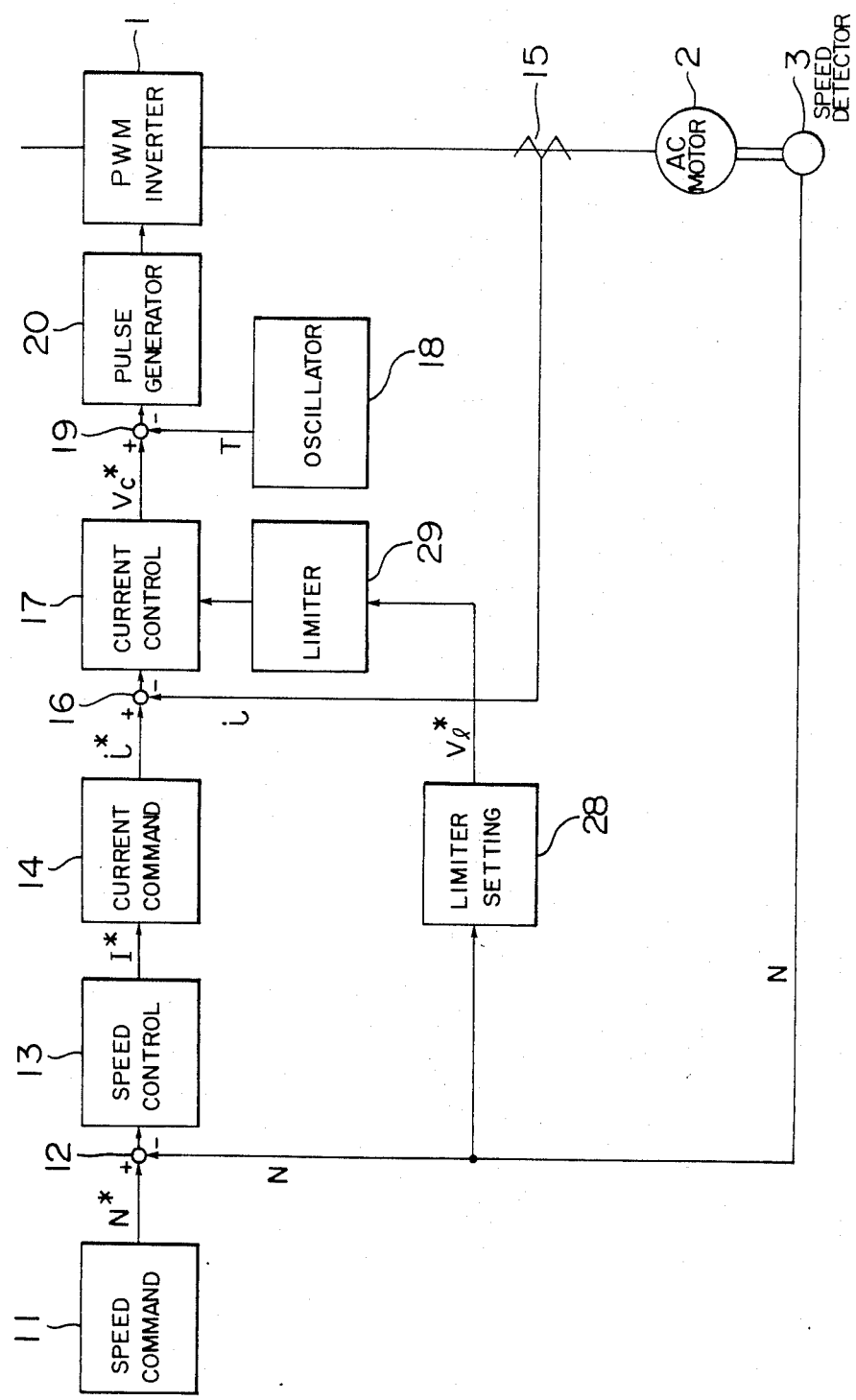
FIG. 1 is a block diagram showing the structure of an embodiment of the present invention.

Referring to FIG. 1, an AC motor 2 is driven by a PWM inverter 1. The PWM inverter 1 includes switching elements such as gate turn-off thyristors or transistors of Graetz connection and flywheel diodes connected in inverse-parallel relation to the associated switching elements respectively. The output current i in each phase of the PWM inverter 1 is detected by an associated current detector 15. A speed detector 3 is mechanically directly coupled to the AC motor 2.

A speed command signal N* from a speed command circuit 11 and a detected speed signal N from the speed detector 3 are added in illustrated polarities in an adder 12, and the adder output signal indicative of the speed error ΔN is applied to a speed control circuit 13. The speed control circuit 13 generates a current control signal (a DC signal) I* which commands the magnitude of the current input to the motor 2 and which is proportional to the speed error ΔN. The current control signal I* is applied to a current command circuit 14. In response to the application of the current control signal I*, the current command circuit 14 generates a current command signal (a sinusoidal wave signal) i* for each phase in a manner as described later. When the motor 2 is a three-phase motor, the current command circuit 14 generates three current command signals having a 120° phase difference therebetween. However, only one current command signal i* is shown for simplicity of description. The current command signal i* and the detected current signal i detected at the current detector 15 in each phase are added in illustrated polarities in an adder 16. The adder output signal indicative of the current error Δi in each phase is applied to a current control circuit 17 which generates a voltage command signal $V_c^*$ of sinusoidal waveform having an amplitude varying depending on the current error Δi.

Figure 3:
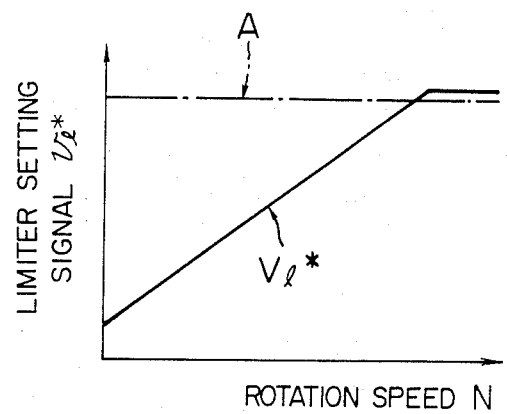
FIG. 3 is a graph showing the operating characteristic of the limiter level setting circuit shown in FIG. 1.

The detected speed signal N is also applied to a limiter level setting circuit 28 which generates a limiter level setting signal $V_l^*$ which is proportional to the rotation speed of the motor 2 in a low-speed rotation range, as shown in FIG. 3. In response to the application of the limiter level setting signal $V_l^*$, a limiter circuit 29 limits the maximum positive and negative amplitude values of the voltage command signal $V_c^*$ for each phase. The detailed structure of the current control circuit 17 and limiter circuit 29 will be described later. The voltage command signal (a modulation signal) $V_c^*$ and a triangular waveform signal (a carrier wave signal) T generated from an oscillator 18 are added in illustrated polarities in an adder 19 which is provided for each phase and applies its output signal to an associated pulse generator circuit 20. On the basis of the polarity of the output signal of the associated adder 19, the pulse generator circuit 20 generates a pulse width modulation (PWM) pulse signal for turning on/off the switching elements constituting the PWM inverter 1.

In FIG. 1, the current detector 15, adder 16, current control circuit 17, adder 19 and pulse generator circuit 20 corresponding to one phase are only shown for simplicity of illustration, although the number of them must correspond to the number of phases of the PWM inverter 1.

Figure 2:
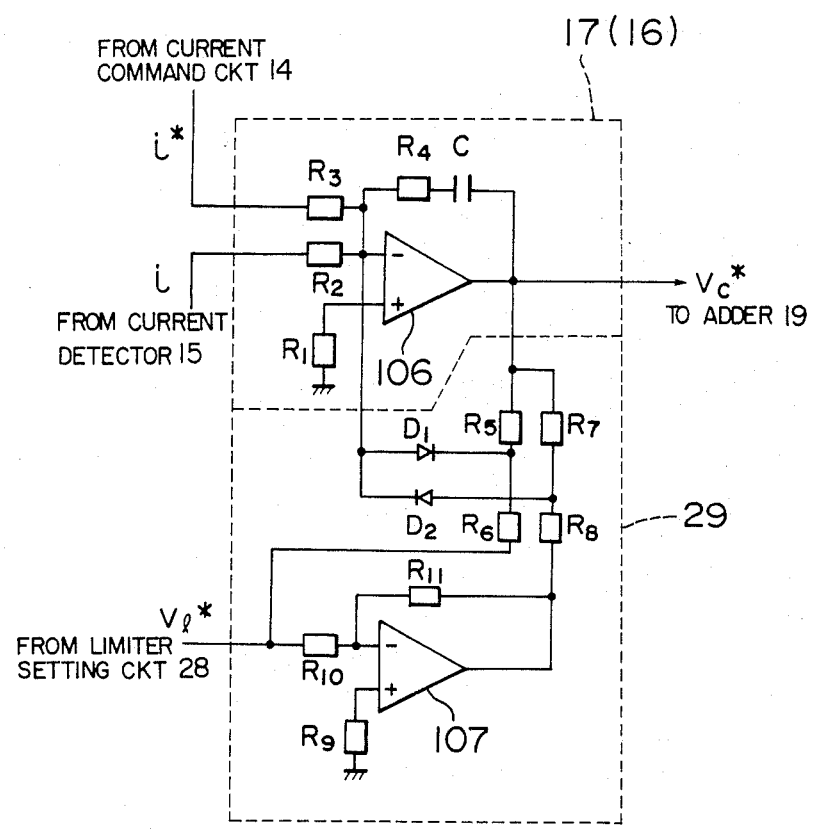
FIG. 2 is a circuit diagram showing in detail the structure of one form of the current control circuit and limiter circuit in FIG. 1.

FIG. 2 is a detailed circuit diagram of the current control circuit 17 (including the adder (6)) and the limiter circuit 29 shown in FIG. 1.

Referring to FIG. 2, the current command signal i* and the detected current signal i are compared with each other through input resistors $R_3$ and $R_2$, and the error signal indicative of the error Δi therebetween is applied to the inverted input terminal (−) of an operational amplifier 106. The non-inverted input terminal (+) of the operational amplifier 106 is grounded through a grounding resistor $R_1$, and a series circuit of a capacitor C and a feedback resistor $R_4$ is connected between the inverted input terminal (−) and the output terminal of the operational amplifier 106. The operational amplifier 106, resistors $R_1$ to $R_4$ and capacitor C constitute the adder 16 and current control circuit 17.

The limiter level setting signal $V_l^*$ is applied through an input resistor $R_{10}$ to the inverted input terminal (−) of another operational amplifier 107 whose non-inverted input terminal (+) is grounded through a grounding resistor $R_9$. A feedback resistor $R_{11}$ is connected between the inverted input terminal (−) and the output terminal of the operational amplifier 107. The output terminals of the two operational amplifiers 106 and 107 are connected through voltage-dividing resistors $R_7$ and $R_8$. The output terminal of the operational amplifier 106 is connected to the inverted input terminal (−) of the operational amplifier 107 through voltage-dividing resistors $R_5$, $R_6$ and the input resistor $R_{10}$. The connection point of the resistors $R_5$ and $R_6$ is connected to the cathode of a diode $D_1$ whose anode is connected to the inverted input terminal (−) of the operational amplifier 106. Another diode $D_2$ is connected at its anode to the connection point of the resistors $R_7$ and $R_8$ and at its cathode to the inverted input terminal (−) of the operational amplifier 106.

The operation of the embodiment shown in FIG. 1 will now be described.

Depending on the speed error ΔN, the speed control circuit 13 generates the current control signal I* commanding the magnitude of the input currents (the active components) i of the AC motor 2. In response to the application of the current control signal I*, the current command circuit 14 makes necessary computation as described below to generate the current command signals When the AC motor 2 is a synchronous motor, the current control signals i* are computed according to the following equation:

$$i^* = I^* \sin \omega t \quad (1)$$

In the equation (1), $\sin \omega t$ represents the standard-phase sinusoidal wave signal which is derived from a position detector (not shown) mounted on the end of the shaft of the AC motor 2 or from the terminal voltage of the AC motor 2, as is well known in the art.

On the other hand, when the AC motor 2 is an induction motor, and the so-called vector control is carried out in which the torque component (the active component) of the primary current in each phase is controlled independently of the exciting current component, the current command signals $i^*$ are computed according to the following equation:

$$\begin{aligned} i^* &= Ia^* \cos \omega t + Ib^* \sin \omega t \\ &= I^* \sin(\omega t + \theta) \end{aligned} \quad (2)$$

where $$\left. \begin{aligned} I^* &= \sqrt{Ia^{*2} + Ib^{*2}} \\ \theta &= \tan^{-1}(Ia^*/Ib^*) \end{aligned} \right\} \quad (3)$$

In the equation (2), $Ia^*$ represents the torque current component and corresponds to the output signal $I^*$ of the speed control circuit 13, while $Ib^*$ corresponds to the exciting current component of the induction motor and is generally a constant. Also, in the equation (2), $\sin \omega t$ and $\cos \omega t$ represent the standard-phase sinusoidal wave signals of two phases and correspond to the magnetic flux phases in the induction motor, as is commonly known in the art.

The current command circuit 14 generates the current command signals $i^*$ in the manner above described.

The current control circuit 17 in each phase generates the voltage command signal $V_c^*$ whose amplitude is proportional to the error $\Delta i$ between the current command signal $i^*$ and the detected current signal $i$, and this voltage command signal $V_c^*$ is applied to the adder 19. The limiter circuit 29 limits the maximum amplitude value of the voltage command signals $V_c^*$. The operation of the current control circuit 17 will be described in detail with reference to FIG. 2. The operational amplifier 106 functions as an error amplifier amplifying the error $\Delta i$ between the current command signal $i^*$ and the detected current signal $i$. When now the resistance values of the input resistors $R_2$ and $R_3$ are selected to be equal, and the signals $i^*$ and $i$ have opposite polarities, the voltage command signal $V_c^*$ which is the output of the operational amplifier 106 is given by the following equation:

$$Vc^* = \frac{T_2}{T_1}(i_1^* - i_1) + \frac{1}{T_1}\int(i_1^* - i_1)dt \quad (4)$$

where $T_1 = R_2 \cdot C$ and $T_2 = R_4 \cdot C$. It will be apparent from the equation (4) that the current control circuit 17 makes the so-called proportional plus integral control action.

The amplitude value of the voltage command signal $V_c^*$ generated from the current control circuit 17 is limited by the limiter circuit 29 in a manner as described presently. When the resistance value of the feedback resistor $R_{11}$ is selected to be equal to that of the input resistor $R_{10}$, the operational amplifier 107 generates an output signal $-V_l^*$ which is a polarity-inverted equivalent of the limiter level setting signal $V_l^*$. Suppose that the voltage-dividing resistors $R_5$ to $R_8$ have equal resistance values. Then, the amplitude of the output signal $V_c^*$ of the operational amplifier 106 is limited to lie within the limiter level setting range of $\pm V_l^*$. The diode $D_2$ conducts when the amplitude of the output signal $V_c^*$ of the operational amplifier 106 becomes larger than the upper limiter level setting $+V_l^*$. Consequently, the amplitude of the signal $V_c^*$ is maintained at the level of $+V_l^*$. On the other hand, when the signal $V_c^*$ has a negative polarity and its absolute value $|V_c^*|$ becomes larger than the lower limiter level setting $-V_l^*$, the diode $D_1$ conducts to maintain the amplitude of the signal $-V_c^*$ at the level of $-V_l^*$. In this manner, the amplitude of the output signal $V_c^*$ of the current control circuit 17 is limited by the limiter circuit 29. The limiter level setting range is expressed by $\pm R_6/R_5 \cdot V_l^*$ when the resistance values of the resistors $R_5$ and $R_7$, those of the resistors $R_6$ and $R_8$, and those of the resistors $R_{10}$ and $R_{11}$ are selected to be equal, respectively. Therefore, the maximum amplitude value (the absolute value) of the voltage command signal $V_c^*$ can be changed as desired by suitably selecting the value of the limiter level setting signal $V_l^*$.

Returning to FIG. 1, in response to the application of the detected speed signal N, the limiter level setting circuit 28 generates the limiter level setting signal $V_l^*$ which is proportional to the rotation speed N of the AC motor 2, as shown in FIG. 3. Therefore, the amplitude of the voltage command signal $V_c^*$ generated from the current control circuit 17 increases with the increase in the rotation speed N of the AC motor 2. The voltage command signal $V_c^*$ obtained from the current control circuits 17 in the manner above described is applied to the adders 19 as the modulation signal. The adder 19, to which the triangular wave signal T generated from the oscillator 18 is applied, generates an output signal of positive polarity during the period in which the modulation signal $V_c^*$ and the carrier wave signal T have the relation $V_c^* > T$, while the adder 19 generates an output signal of negative polarity during the period in which the signals $V_c^*$ and T have the relation $V_c^* < T$. The pulse generator circuit 20 generates a PWM pulse signal of "1" level during the period in which the polarity of the output signal of the adder 19 is positive, while the pulse generator circuit 20 generates a PWM pulse signal of "0" level during the period in which the polarity of the adder output signal is negative. The switching elements in the PWM inverter 1 are on-off controlled by such a PWM pulse signal so that the output current $i$ of the PWM inverter 1 can be so controlled as to follow up the current command signal $i^*$. Such an operation is similarly performed for the other phases with a 120° phase difference when the PWM inverter 1 is of the three-phase type. As a result, the AC motor 2 is supplied with the currents of magnitude proportional to the current control signal $I^*$ generated from the speed control circuit 12 and rotates at the rotation speed commanded by the speed command signal N.

In the present invention, the PWM inverter 1 is controlled in a manner as described above, and the limiter level setting signal $V_l^*$ includes in proportion to the rotation speed N of the AC motor 2. Thus, the number of times of useless switching of the switching elements due to ripple components included in the voltage command signals $V_c^*$ can be reduced to a minimum. This fact will be clarified with reference to FIGS. 5a and 5b.

Figure 5B:
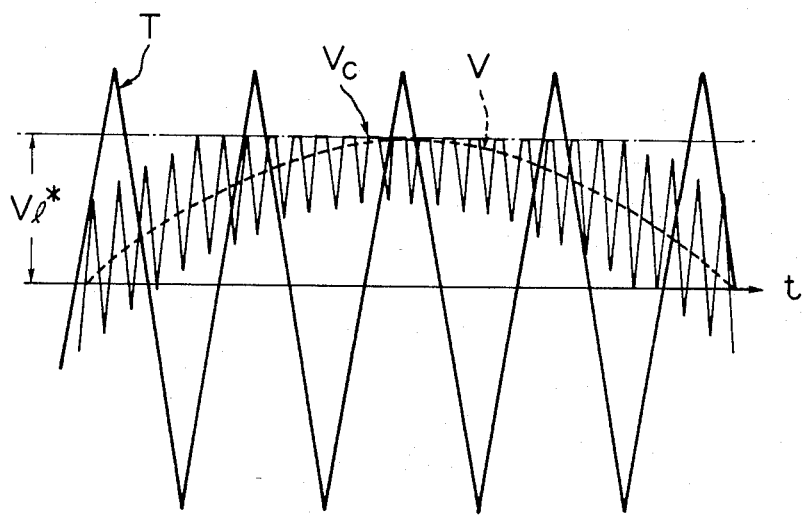

FIGS. 5a and 5b are waveform diagrams to illustrate how the PWM pulse signal applied to the PWM inverter 1 in the presence of the limiter circuit 29 differs from that applied in the absence of the limiter circuit 29.

FIG. 5a shows the relation between the carrier wave signal T and the voltage command signal $V_c^*$ when the limiter circuit 29 is not provided, together with the waveform of the PWM pulse signal appearing from the pulse generator circuit 20 in such a case. The dotted waveform shown in FIG. 5a represents the fundamental wave component of the voltage. On the other hand, FIG. 5b shows the same relation when the limiter circuit 29 is provided, together with the waveform of the PWM pulse signal appearing from the circuit 20 in the presence of the limiter circuit 29.

The PWM pulse signal generated from the pulse generator circuit 20 is related with the corresponding output voltage (the effective value) of the PWM inverter 1. When the output signal of the operational amplifier 106 is limited by the limiter level setting $V_f^*$ shown by the one-dot chain line in FIG. 5b, the amplitude of ripple components included in the voltage command signal $V_c^*$ is decreased. Therefore, the PWM pulse signal has a waveform as shown in FIG. 5b, and it will be apparent from comparison of FIG. 5b with FIG. 5a that the number of times of switching of the switching elements can be decreased by the number of PWM pulses shown by the hatching in FIG. 5a. It is desirable that the level of the limiter level setting $V_f^*$ is selected to be slightly higher than the peak of the fundamental wave component of the voltage V shown by the broken curve in FIG. 5b.

Figure 4:
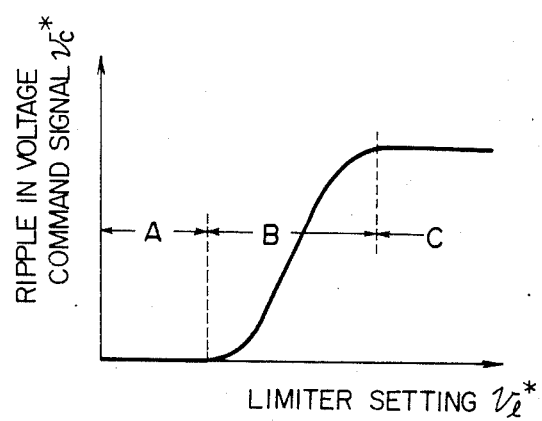
FIG. 4 is a graph showing the relation between the limiter level setting and ripples included in the voltage command signal.

FIG. 4 shows the relation between the limiter level setting $V_f^*$ and the amplitude of ripples included in the voltage command signal $V_c^*$ when the peak of the current command signal $i^*$ is maintained constant. It can be seen from FIG. 4 that the smaller the limiter level setting $V_f^*$, the amplitude of ripples is smaller. Referring to FIG. 4, in the region A, the limiter level setting $V_f^*$ is smaller than the value of the fundamental wave component of the voltage V, and the output voltage of the PWM inverter 1 is not sufficiently generated resulting in low responsivity of the current control, although the amplitude of ripples is zero. In the region B, the current control provides a desired responsivity, and the amplitude of ripples increases in proportion to the limiter level setting $V_f^*$. In the region C, the operational amplifier 107 in the limiter circuit 29 is saturated, and the limiter action would not change even when the limiter level setting $V_f^*$ is increased. The above proves that the limiter level setting $V_f^*$ is preferably set to lie in the region B in close proximity to the region A.

Figure 5B:
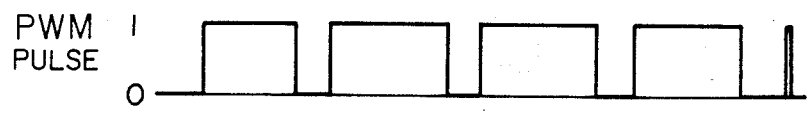

The upper and lower limiter levels are provided by the limiter level setting circuit 28. The fundamental wave component of the output voltage V of the PWM inverter 1, shown by the dotted curve in FIG. 5, increases in proportion to the rotation speed N of the AC motor 2. The limiter level setting circuit 28 generates the limiter level setting signal $V_f^*$ which is proportional to the rotation speed N of the AC motor 2 as shown in FIG. 3. It will be noted in FIG. 3 that the limiter level setting $V_f^*$ is selected to be slightly larger than the amplitude A of the triangular wave signal T in a high-speed rotation range of the AC motor 2 in which the peak of the fundamental wave component V of the output voltage of the PWM inverter 1 is high, so that the required output voltage can be sufficiently provided in that range.

It will be seen that, by limiting the amplitude of the voltage command signal $V_c^*$ in the manner above described, the number of times of switching of the switching elements in the PWM inverter 1 can be decreased in a low-speed rotation range in which the level of the voltage induced in the AC motor 2 is low and the proportion of ripples is large. Therefore, the higher harmonic current included in the inverter output currents supplied to the AC motor 2 in the low-speed rotation range can be decreased to reduce the undesirable noise.

It will be seen from the above description of the present invention that the amplitude of ripples included in the voltage command signal commanding the fundamental wave component of the output voltage in each phase of the PWM inverter can be lowered so that useless switching of the switching elements in the PWM inverter can be avoided, and the undesirable noise can be reduced especially in the low-speed rotation range of the AC motor.

Further, because of the fact that the limiter level setting is changed in substantially proportional relation to the rotation speed of the AC motor, hence, the magnitude of the induced voltage, the gain of the closed loop including the AC motor remains substantially unchanged, and the control response is not lowered.

The level of noise (electromagnetic sound) will become relatively high in the high-speed rotation range of the AC motor, since the limiter circuit is not effective is such a range. However, the electromagnetic sound generated in the high-speed rotation range of the AC motor is relatively not appreciable since it is cancelled by the large mechanical sound generated from the AC motor in that range.

Figure 6:
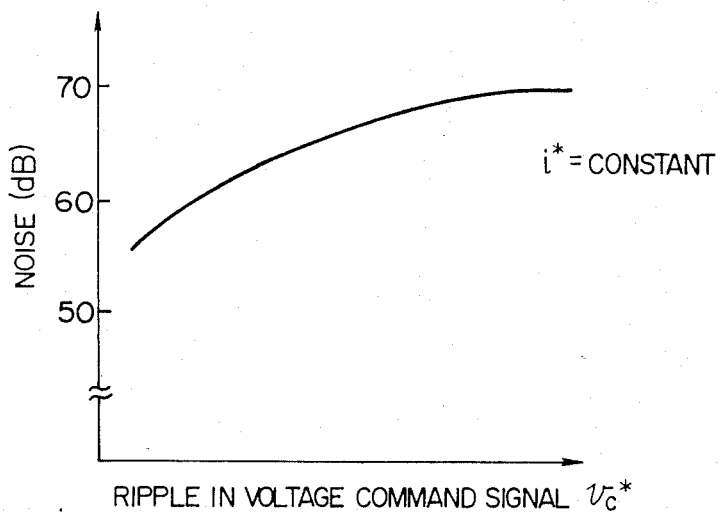
FIGS. 6 and 7 show experimental results of measurement of noise for illustrating the effect of the present invention.
Figure 7:
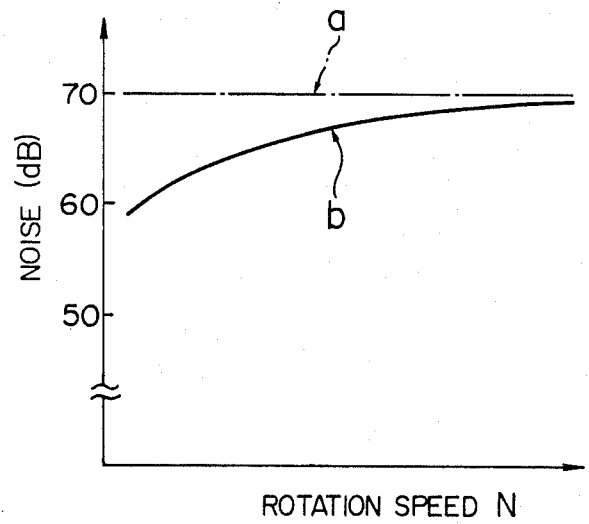

FIGS. 6 and 7 show experimental results of measurement of noise in the embodiment of the present invention shown in FIG. 1.

FIG. 6 is a graph showing the relation between the measured level of noise and the amplitude of ripples included in the voltage command signal $V_c^*$ when the level of the current command signal $i^*$ was maintained constant in an experiment conducted by the inventors. It will be apparent from FIG. 6 that the smaller the amplitude of ripples, the lower is the level of noise.

FIG. 7 is a graph showing the relation between the measured level of noise and the rotation speed N of the AC motor 2.

The one-dot chain curve a shown in FIG. 7 represents the level of noise when the voltage command signal $V_c^*$ was not limited by the limiter circuit 29. In contrast, the solid curve b shown in FIG. 7 represents the level of noise when the limiter level setting limiting the voltage command signal $V_c^*$ was changed in proportion to the rotation speed N of the AC motor 2 in accordance with the present invention. It will be apparent from FIG. 7 that, according to the present invention, the level of noise is generally reduced over the entire speed range, and the noise level can be remarkably reduced especially in the low-speed rotation range.

Figure 8:
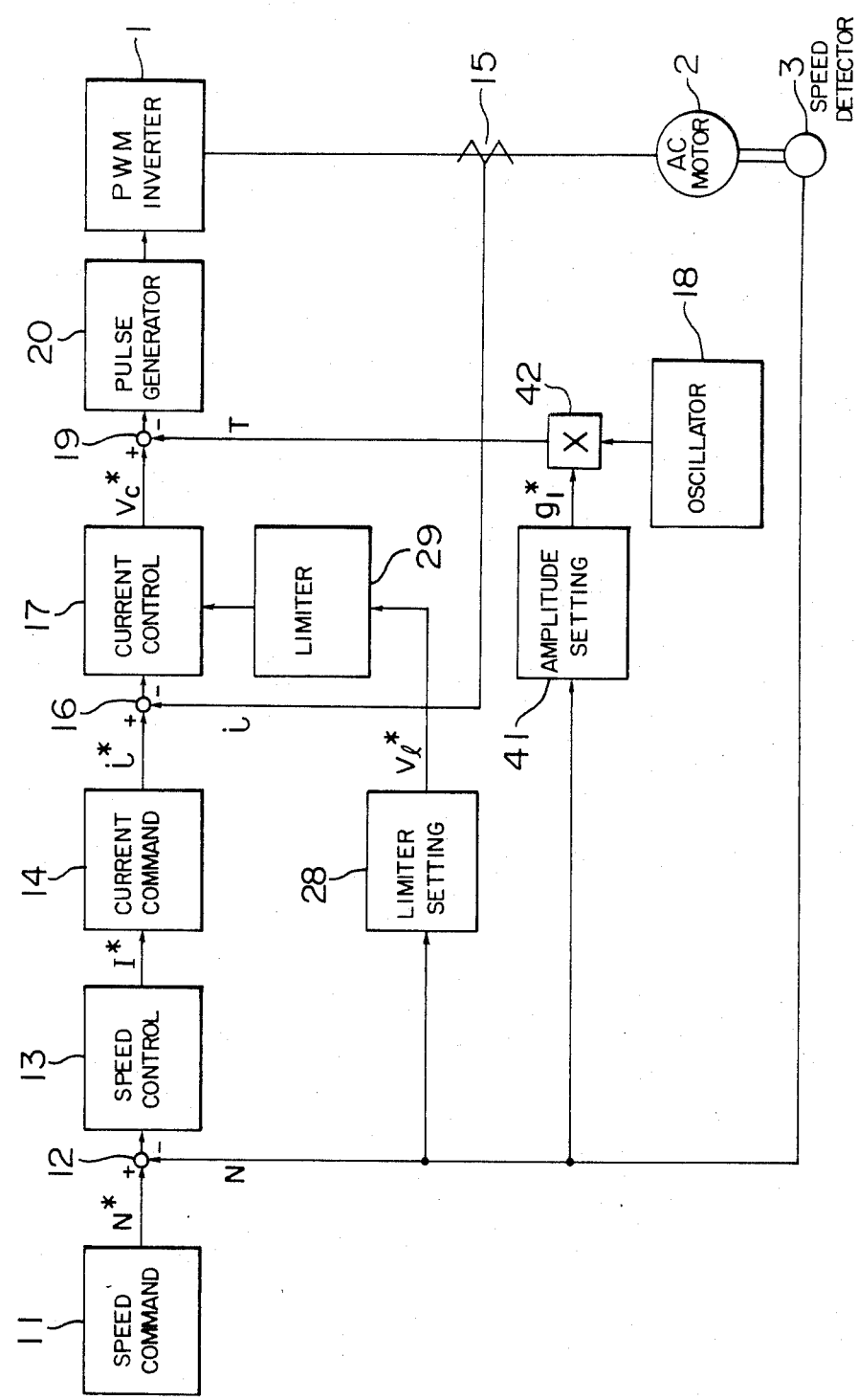
FIG. 8 is a block diagram showing the structure of another embodiment of the present invention.

FIG. 8 shows another embodiment of the present invention in which the voltage command signal $V_c^*$ is similarly limited, and the amplitude value of the carrier wave signal T is changed.

Figure 9A:
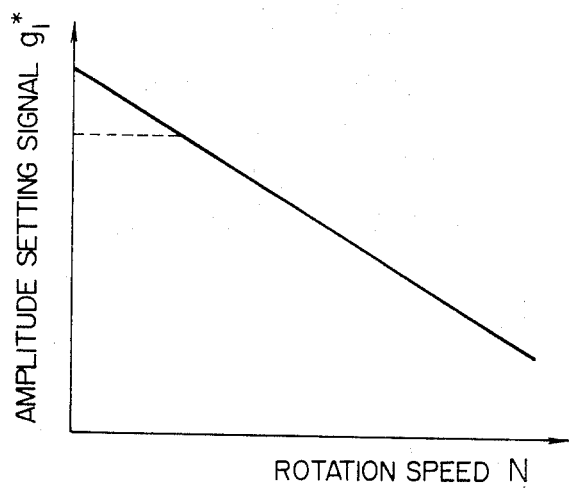
FIGS. 9a and 9b are graphs showing the operating characteristic of one form of the amplitude setting circuit shown in FIG. 8.

In FIG. 8, the same reference numerals are used to designate the same or equivalent parts appearing in FIG. 1. The reference numberal 41 designates an amplitude setting circuit which generates an amplitude setting signal $g_1^*$ for setting the amplitude of the carrier wave signal T depending on the rotation speed N of the AC motor 2, as shown in FIG. 9a. The reference numeral 42 designates a multiplier by which the amplitude of the carrier wave signal T generated from the oscillator 18 is changed in response to the amplitude setting signal $g_1^*$ applied thereto.

In addition to the operation of the embodiment described with reference to FIG. 1, the embodiment shown in FIG. 8 operates in a manner as described presently.

The amplitude setting signal $g_1^*$ generated from the amplitude setting circuit 41 linearly decreases with the increase of the rotation speed of the AC motor 2, as shown in FIG. 9a. The carrier wave signal T is multiplied by the amplitude setting signal $g_1^*$ in the multiplier 42, and the resultant output signal of the multiplier 42 is applied to the adder 19. The amplitude of the carrier wave signal (the triangular wave signal) T applied to the adder 19 decreases with the increase of the rotation speed N of the AC motor 2. The output voltage V in each phase of the PWM inverter 1 is given by the following expression (5):

$$V \propto \frac{V^*}{A} \quad (5)$$

where $V^*$ is the amplitude value of the voltage command signal $V_c^*$ generated from the current control circuit 17, and A is the amplitude value of the carrier wave signal (the triangular wave signal) T which is the output signal of the multiplier 42. It can be seen that the output voltage V of the PWM inverter 1 is proportional to the amplitude value $V^*$ of the voltage command signal $V_c^*$ and is inversely proportional to the amplitude value A of the carrier wave signal T. Therefore, when the amplitude value A of the carrier wave signal T applied to the adder 19 is decreased with the increase of the rotation speed N of the AC motor 2, the rate of increase of the amplitude value of the voltage command signal $V_c^*$ can be reduced with increase of the speed command. Thus, the voltage command signal $V_c^*$ need not be increased to a large amplitude, the current control circuit 17 can be designed to operate with a small gain so as to decrease the amplitude of ripples included in the signal $V_c^*$. Since thus the amplitude of ripples included in the voltage command signal $V_c^*$ can be reduced to be smaller than that in the embodiment shown in FIG. 1, the undesirable noise can be further reduced.

Figure 10:
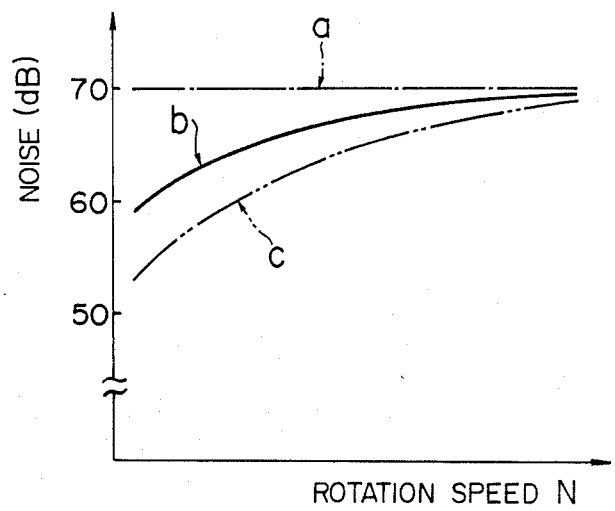
FIG. 10 shows experimental results of measurement of noise relative to the rotation speed for illustrating the effect of the embodiment shown in FIG. 8.

FIG. 10 is a graph showing the relation between the measured level of noise and the rotation speed N of the AC motor 2 in the embodiment shown in FIG. 8.

The curves a and b in FIG. 10 are the same as those shown in FIG. 7, and the two-dot chain curve c in FIG. 10 represents the noise level reduction characteristic of the embodiment shown in FIG. 8. It will be seen that the embodiment shown in FIG. 8 can reduce the noise to a level lower than that in the embodiment shown in FIG. 1.

Figure 9B:
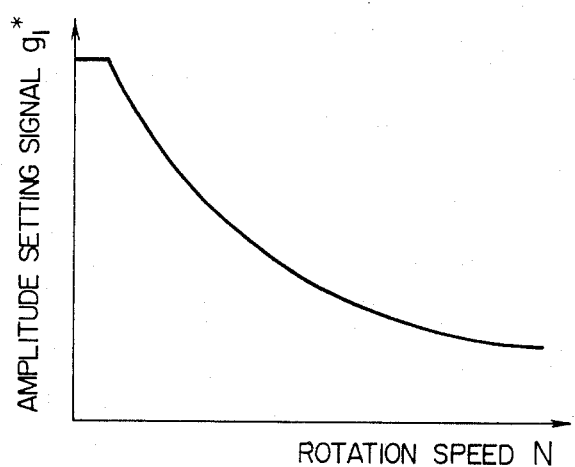

The operating characteristic of the amplitude setting circuit 41 may be such that it is constant in a low-speed rotation range of the AC motor 2 as shown by the broken line in FIG. 9a if the multiplier 42 tends to saturate in such a rotation speed range. Further, the operating characteristic of the amplitude setting circuit 41 may be hyperbolic as shown in FIG. 9b.

Although the multiplier 42 is provided in the embodiment shown in FIG. 8 to change the amplitude of the carrier wave signal T, the amplitude of this signal T may be changed directly in the interior of the oscillator 18.

Figure 11:
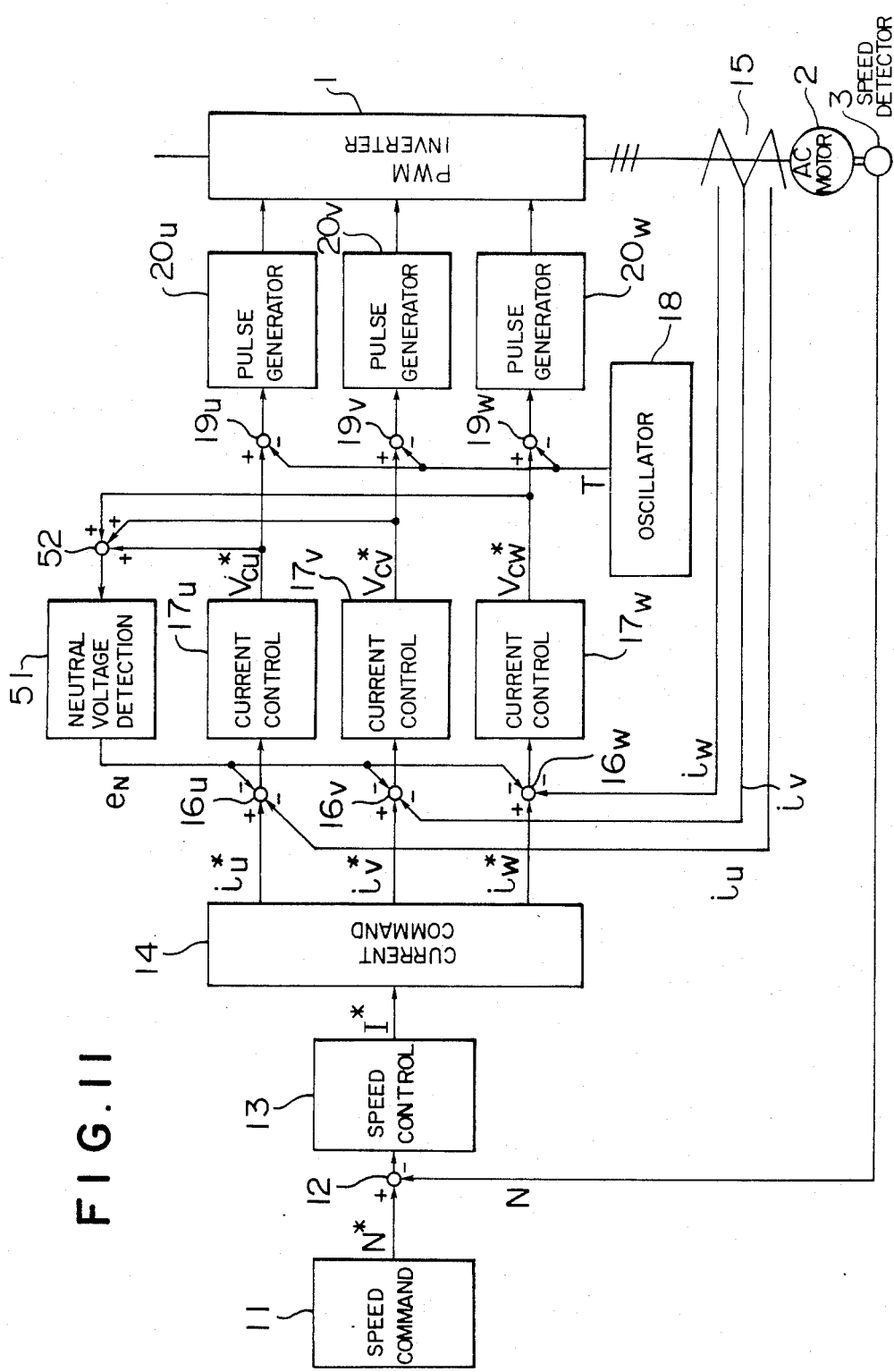
FIG. 11 is a block diagram showing the structure of still another embodiment of the present invention.

FIG. 11 shows still another embodiment of the present invention in which the same reference numerals are used to designate the same or equivalent parts appearing in FIG. 1.

In FIG. 11, the current command circuit 14 is shown as generating current command signals $i_U^*$, $i_V^*$ and $i_W^*$ of the U-phase, V-phase and W-phase respectively, and the current detector 15 is shown as detecting currents $i_U$, $i_V$ and $i_W$ of the U-phase, V-phase and W-phase respectively. The combination of the adder 16, current control circuit 17, adder 19 and pulse generator circuit 20 is provided for each of the three phases, and suffixes U, V and W are affixed thereto to distinguish those belonging to the U-phase, V-phase and W-phase respectively. In the embodiment shown in FIG. 11, voltage command signals $V_{cu}^*$, $V_{cv}^*$ and $V_{cw}^*$ generated from the respective current control circuits 17U, 17V and 17W are added in an adder 52, and the resultant output signal of the adder 52 is applied to a neutral voltage detection circuit 51. The neutral voltage signal $e_N$ generated from the neutral voltage detection circuit 51 is applied to the adders 16U, 16V and 16W in an illustrated polarity or in a polarity opposite to the polarity of the current command signals $i_U^*$, $i_V^*$ and $i_W^*$ respectively.

In the structure shown in FIG. 11, the current command circuit 14 generates the U-phase, V-phase and W-phase current command signals $i_U^*$, $i_V^*$ and $i_W^*$. The current control circuits 17U, 17V and 17W generate the voltage command signals $V_{cu}^*$, $V_{cv}^*$ and $V_{cw}^*$ having amplitudes proportional to the errors $\Delta i_U$, $\Delta i_V$ and $\Delta i_W$ between the current command signals $i_U^*$, $i_V^*$, $i_W^*$ and the detected current signals $i_U$, $i_V$, $i_W$ respectively. The voltage command signals $V_{cu}^*$, $V_{cv}^*$ and $V_{cw}^*$ are applied as modulation signals to the adders 19U, 19V and 19W respectively together with the triangular wave signal T generated from the oscillator 18 to be compared with the signal T. The pulse generator circuits 20U, 20V and 20W generate PWM pulse signals turned into their "1" level during the period in which the relation $V^* > T$ holds, and such PWM pulse signals are applied to the switching elements in the PWM inverter 1. The switching elements in the PWM inverter 1 are on-off controlled by the corresponding PWM pulse signals so that the U-phase, V-phase and W-phase output currents $i_U$, $i_V$ and $i_W$ of the PWM inverter 1 are controlled to follow up the current command signals $i_U^*$, $i_V^*$ and $i_W^*$ respectively.

The above-described operation of the present embodiment controlling the PWM inverter 1 is similar to that of the embodiment shown in FIG. 11. In the embodiment shown in FIG. 11, the voltage command signals $V_{cu}^*$, $V_{cv}^*$ and $V_{cw}^*$ are added in the adder 52, and the neutral voltage signal $e_N$ detected by the neutral voltage detection circuit 51 on the basis of the result of addition in the adder 52 is added as a negative feedback signal to the current command signals $i_U^*$, $i_V^*$ and $i_W^*$ in the adders 16U, 16V and 16W respectively. The voltage command signals $V_{cu}^*$, $V_{cv}^*$ and $V_{cw}^*$ are proportional to the output voltages of the PWM inverter 1 and are balanced. When the three-phase output voltages of the PWM inverter 1 are balanced, the neutral voltage signal $e_N$ is zero or null.

On the other hand, when the output voltages of the PWM inverter 1, hence, the voltage command signals $V_{cu}^*$, $V_{cv}^*$ and $V_{cw}^*$ become unbalanced, the neutral voltage signal $e_N$ will take a value proportional to the amount of unbalance. However, because of the negative feedback of the neutral voltage signal $e_N$ to the adders 16U, 16V and 16W for addition to the voltage command signals $i_U^*$, $i_V^*$ and $i_W^*$ in the opposite or inverted polarity, the balance is immediately reached.

Figure 12A:
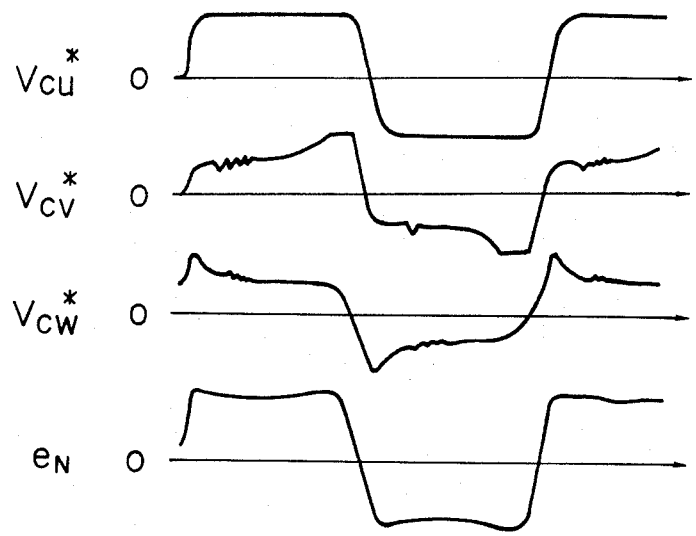
FIGS. 12a and 12b show waveforms of the voltage command signals of the individual phases.
Figure 12B:
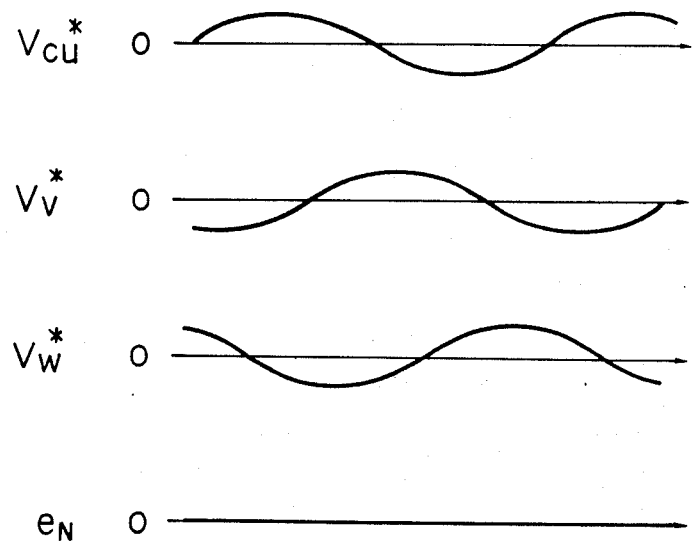

FIGS. 12a and 12b show, by way of example, the waveforms of the voltage command signals $V_{cu}^*$, $V_{cv}^*$ and $V_{cw}^*$ generated from the respective current control circuits 17U, 17V and 17W.

FIG. 12a shows the waveforms of the voltage command signals $V_{cu}^*$, $V_{cv}^*$ and $V_{cw}^*$ when the neutral voltage signal $e_N$ is not added to the current command signals $i_U^*$, $i_V^*$ and $i_W^*$ in the negative feedback fashion, while FIG. 12b shows the waveforms of the signals $V_{cu}^*$, $V_{cv}^*$ and $V_{cw}^*$ when the neutral voltage signal $e_N$ is added to the signals $i_U^*$, $i_V^*$ and $i_W^*$ in the negative feedback fashion according to the present invention. It will be seen in FIG. 12a that, in the absence of negative feedback of the neutral voltage signal $e_N$, the voltage command signals $V_{cu}^*$, $V_{cv}^*$ and $V_{cw}^*$ are not balanced and include higher harmonic components. In contrast, it will be seen in FIG. 12b showing the waveforms resulting from the negative feedback of the neutral voltage signal $e_N$ according to the present invention, the signals $V_{cu}^*$, $V_{cv}^*$ and $V_{cw}^*$ are balanced and have sinusoidal waveforms free from higher harmonic components.

The reason therefor will now be described. When the voltage command signals $V_{cu}^*$, $V_{cv}^*$ and $V_{cw}^*$ are out of balance, that is, when the output S of the adder 52 given by the expression $$S = V_{cu}^* + V_{cv}^* + V_{cw}^* \neq 0 \tag{6}$$

appears from the adder 52, the neutral voltage signal $e_N$ generated from the neutral voltage detection circuit 51 has a level proportional to the amount of unbalance S, and such a neutral voltage signal $e_N$ is added in the negative feedback fashion to the current command signals $i_U^*$, $i_V^*$ and $i_W^*$ so as to nullify the unbalance S. The relation between the neutral voltage signal $e_N$ and the waveform distortion of the voltage command signals $V_c^*$ ($V_{cu}^*$, $V_{cv}^*$, $V_{cw}^*$), hence, ripples is as shown in FIG. 13.

Thus, the voltage command signals $V_{cu}^*$, $V_{cv}^*$ and $V_{cw}^*$ are freed from inclusion of higher harmonic components so that the level of noise generated from the AC motor 2 can be reduced and the loss can also be minimized. The noise level reduction permits an increased gain of the current control circuits 17U, 17V and 17W thereby improving the current control response.

In the embodiment shown in FIG. 11, the neutral voltage signal $e_N$ is detected as the sum of the U-phase, V-phase and W-phase voltage command signals $V_{cu}^*$, $V_{cv}^*$ and $V_{cw}^*$. It is apparent, however, that the neutral voltage signal $e_N$ may be detected as the sum of the U-phase, V-phase and W-phase output voltages of the PWM inverter 1 or may be detected from the neutral point of the primary windings of the AC motor 2.

Figure 14:
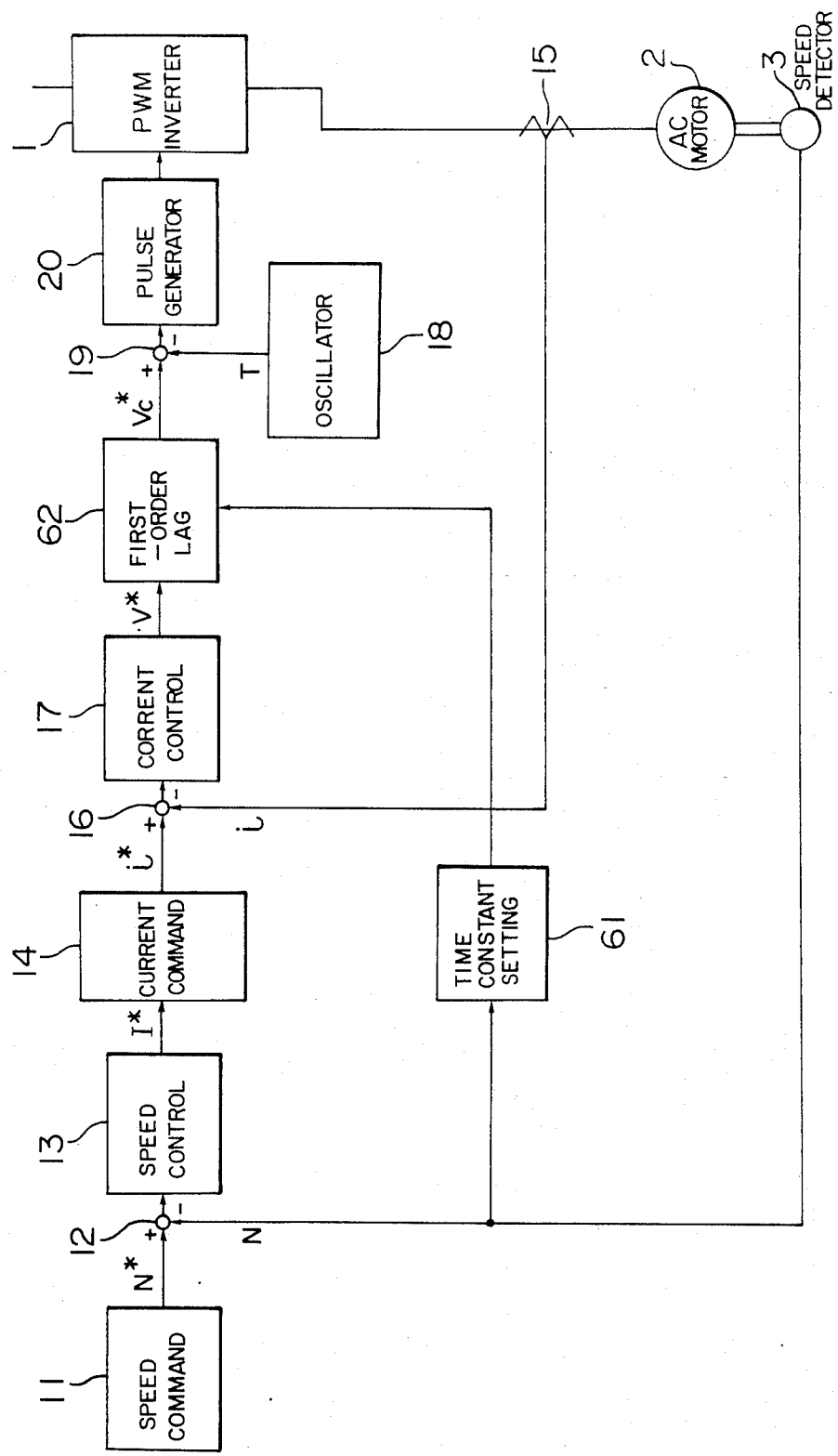
FIG. 14 is a block diagram showing the structure of a further embodiment of the present invention.

FIG. 14 shows a further embodiment of the present invention, in which the same reference numerals are used to designate the same or equivalent parts appearing in FIG. 1. In FIG. 14, a voltage command signal V* generated from the current control circuit 17 is applied through a first-order lag circuit 62 to the adder 19, and the time constant of the first-order lag circuit 62 is set by a time-constant setting circuit 61. In FIG. 14, the output of the current control circuit 17 before being subjected to compensation for ripple reduction or attenuation according to the present invention is called the voltage command signal V*, and the output of the first-order lag circuit 62 after having been subjected to the compensation for ripple reduction is called herein a compensated voltage command signal $V_c^*$. This designation applies also to other embodiments which will be described later.

Figure 15:
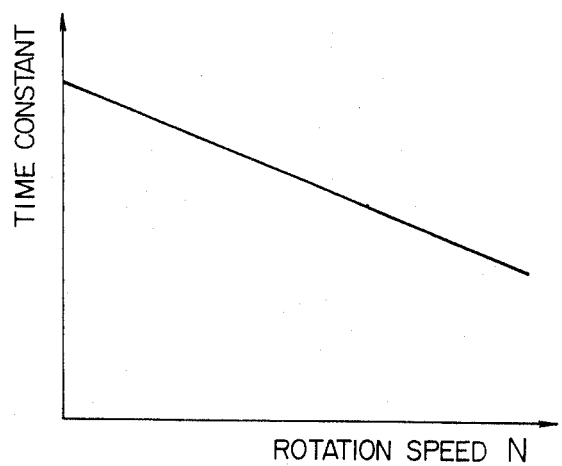
FIG. 15 is a graph showing the operating characteristic of the time-constant setting circuit shown in FIG. 14.
Figure 16:
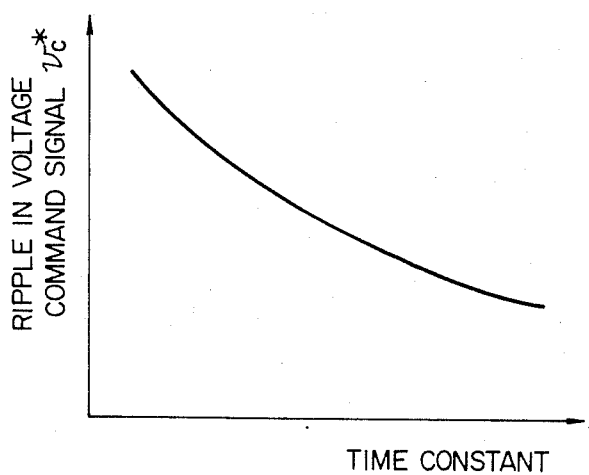
FIG. 16 is a graph showing the relation between the time constant and ripples included in the voltage command signal.

The time-constant setting circuit 61 acts to decrease the time constant of the first-order lag circuit 62 with the increase of the rotation speed N of the AC motor 2, as shown in FIG. 15. The relation between the time constant of the first-order lag circuit 62 and the amplitude of ripples included in the compensated voltage command signal $V_c^*$ is as shown in FIG. 16. Therefore, when the time constant of the first-order lag circuit 62 is changed in a relation inversely proportional to the rotation speed N of the AC motor 2 as shown in FIG. 15, the amplitude of ripples included in the compensated voltage command signal $V_c^*$ becomes smaller in a low-speed rotation range. The amplitude of ripples included in the compensated voltage command signal $V_c^*$ becomes larger with the increase of the rotation speed N of the AC motor 2. The level of noise can be lowered since the amplitude of ripples included in the compensated voltage command signal $V_c^*$ is small in the low-speed rotation range. Since the cut-off frequency of the first-order lag circuit 62 increases in proportion to the rotation speed N of the AC motor 2, the frequency characteristic in responsivity of the closed-loop current control system increases with the increase of the rotation speed N. On the other hand, the frequency characteristic of the current control system also increases when the gain of the current control system is selected to be large. Therefore, changing of the time constant of the first-order lag circuit 62 in inverse proportion to the rotation speed N of the AC motor 2 so as to decrease the time constant with an increase of rotation speed is equivalent to increasing the gain of the current system in proportion to the motor rotation speed N.

Thus, the embodiment shown in FIG. 14 can also reduce noise in a low-speed rotation range and attain the desired speed control with a high response.

The first-order lag circuit 62 may be incorporated in the current control circuit 17 or may be inserted in the feedback path of the detected current signal i to achieve the same effect.

Figure 17:
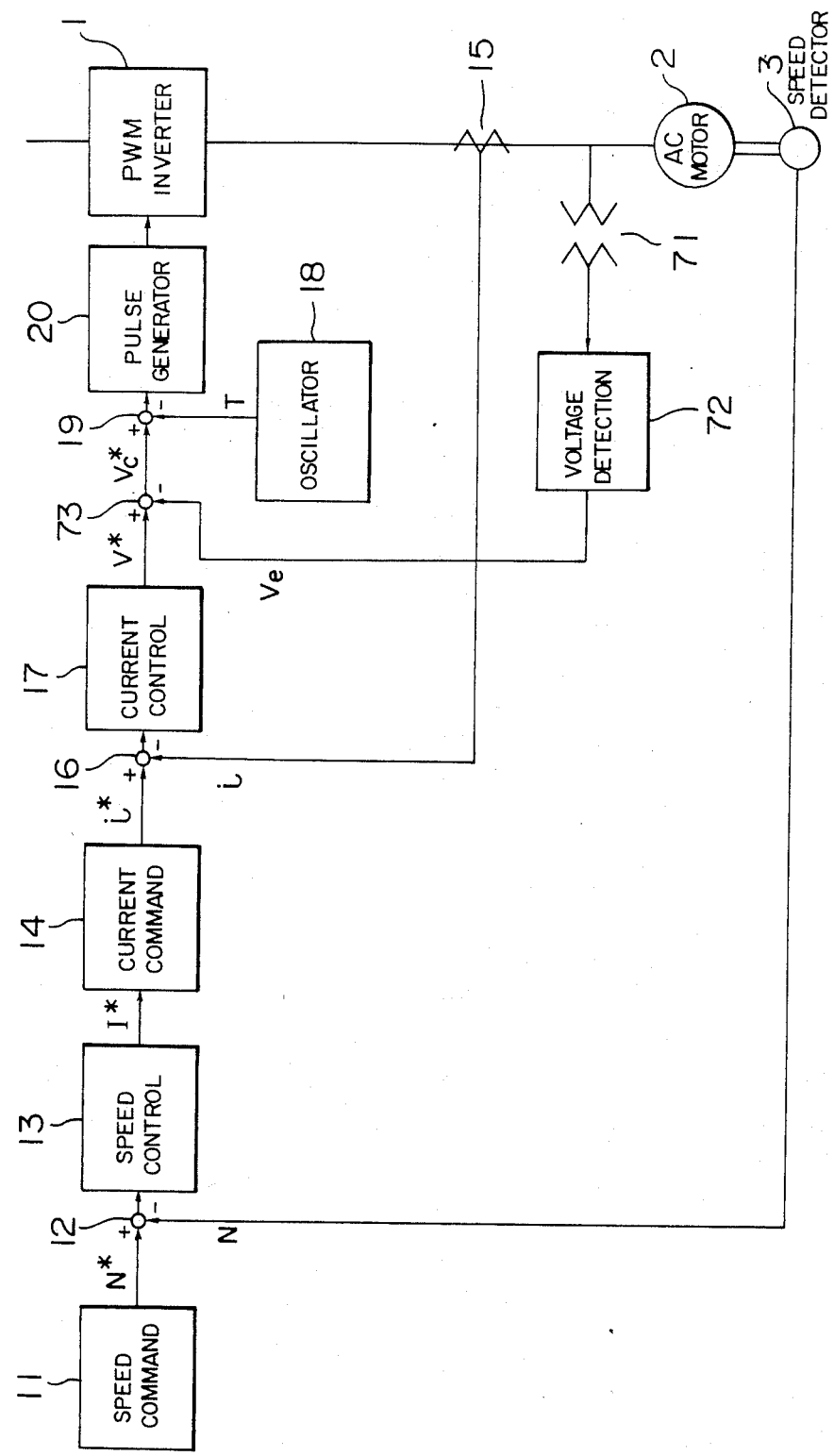
FIGS. 17 and 18 are block diagrams showing the structure of other embodiments of the present invention respectively.

FIG. 17 shows a still further embodiment of the present invention in which the same reference numerals are used to designate the same or equivalent parts appearing in FIG. 1.

Referring to FIG. 17, the output voltage in each phase of the PWM inverter 1 is detected by a transformer 71. The line voltage detected by the transformer 71 is converted into the corresponding phase voltage which is applied to a voltage detection circuit 72 including a filter removing ripple components. The detected voltage signal $V_e$ generated from the voltage detection circuit 72 is added to the voltage command signal V* in an adder 73.

In FIG. 17, the voltage detection circuit 72 detects the phase voltage corresponding to the voltage induced in the AC motor 2 when the drop due to the leakage impedance is ignored. Provided that the excitation current of the AC motor 2 is constant, the magnitude of the induced voltage changes in proportion to the rotation speed N of the AC motor 2. Therefore, when the detected voltage signal $V_e$ generated from the voltage detection circuit 72 is added in the adder 73 to the voltage command signal $V^*$ generated from the current control circuit 17 to provide the compensated voltage command signal $V_c^*$, the gain of the current control system providing the compensated voltage command signal $V_c^*$ depending on the error $\Delta i$ between the detected current signal i and the current command signal i* increases with the increase of the rotation speed N of the AC motor 2. Therefore, the gain of the current control circuit 17 itself need be large, so that the amplitude of ripples included in the compensated voltage command signal $V_c^*$ in a low-speed rotation range of the AC motor 2 can be decreased to reduce the level of noise.

Although the actual inverter output voltage is detected to detect the phase voltage corresponding to the induced voltage in the embodiment shown in FIG. 17, the signal corresponding to the phase voltage can also be obtained in a manner as described below. That is, when the AC motor 2 is an induction motor, and the torque current component of the primary current is controlled independently of the excitation current component, the signal corresponding to the phase voltage can be detected by multiplying the fundamental sinusoidal signal representing the phase of the torque current component by the excitation current component and rotation speed N. Such a signal can also be similarly detected when the AC motor 2 is a synchronous motor.

Figure 18:
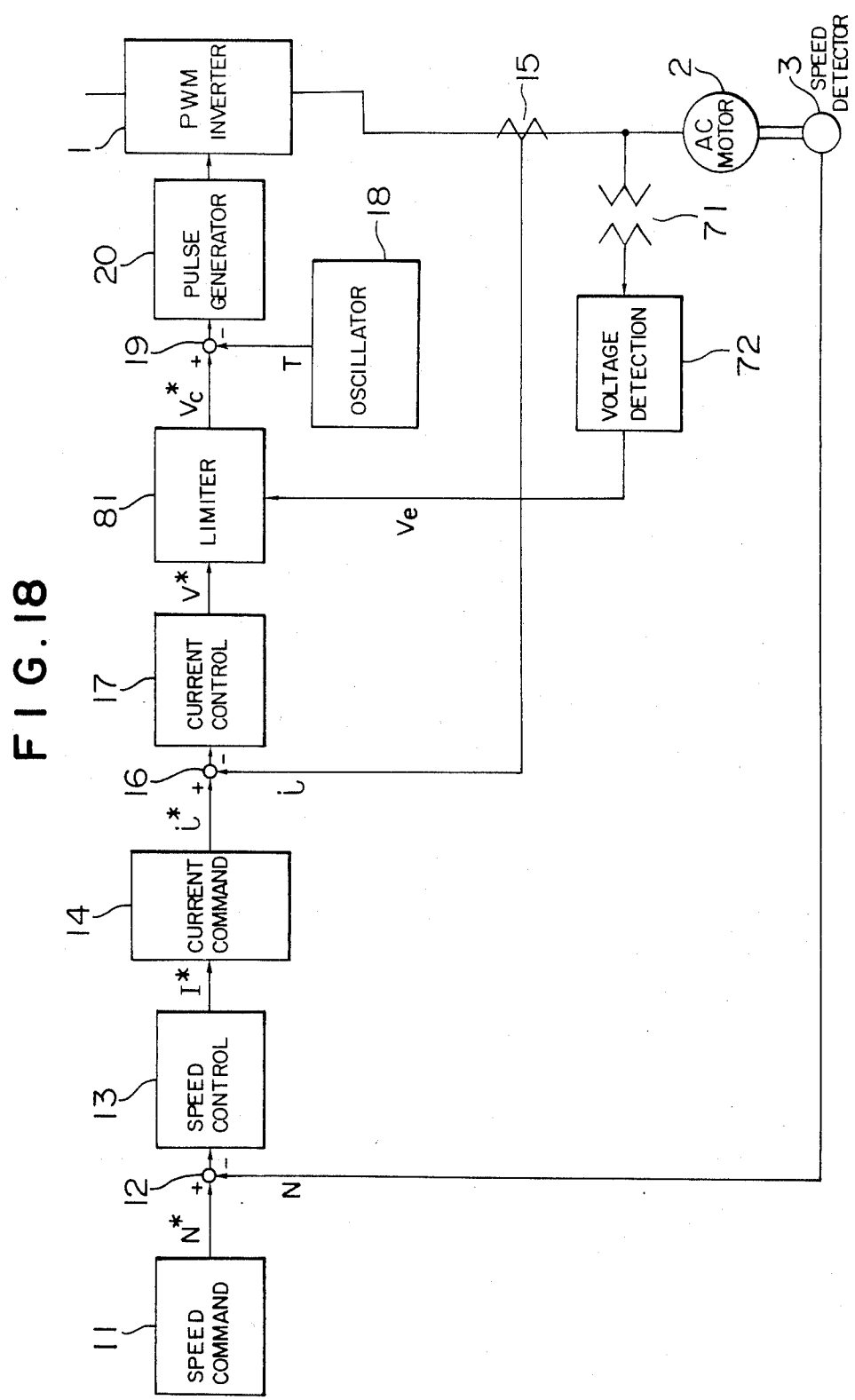

FIG. 18 shows a yet further embodiment of the present invention, in which the same reference numerals are used to designate the same or equivalent parts appearing in FIG. 17.

Referring to FIG. 18, the voltage command signal $V^*$ generated from the current control circuit 17 is applied to a limiter circuit 81, and the limiter level of the limiter circuit 81 is changed depending on the detected voltage signal Ve generated from the voltage detection circuit 72.

Figure 19:
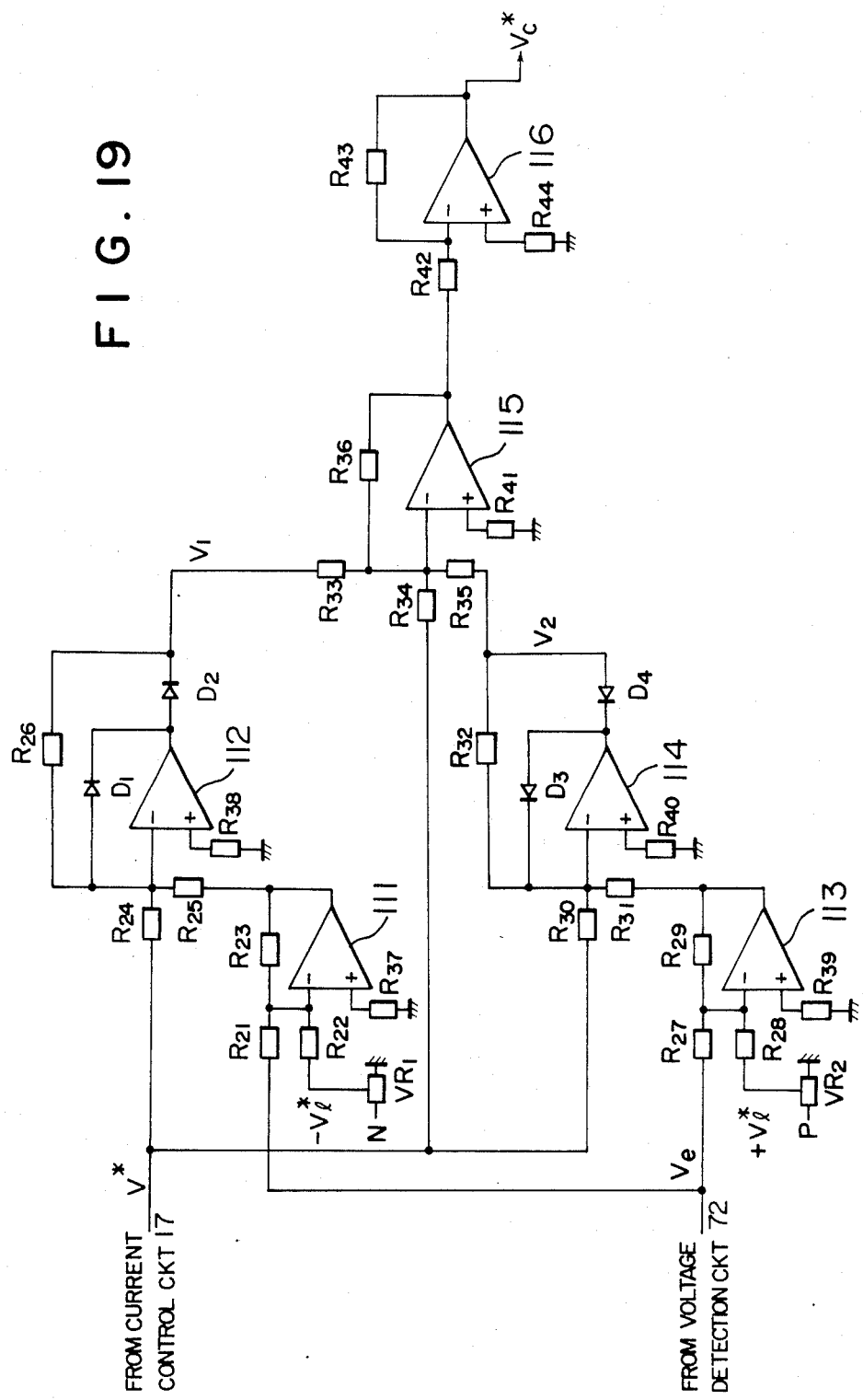
FIG. 19 is a circuit diagram showing in detail the structure of one form of the limiter circuit shown in FIG. 18.

FIG. 19 is a detailed circuit diagram of the limiter circuit 81 shown in FIG. 18.

Referring to FIG. 19, the detected voltage signal Ve is added through resistors $R_{21}$ and $R_{22}$ to a limiter level setting $-V_l^*$ set in a potentiometer $VR_1$, and the resultant signal is then applied to the inverted input terminal $(-)$ of an operational amplifier 111. The noninverted input terminal $(+)$ of the operational amplifier 111 is grounded through a grounding resistor $R_{37}$, and a feedback resistor $R_{23}$ is connected between the inverted input terminal $(-)$ and the output terminal of the operational amplifier 111.

The voltage command signal $V^*$ and the output signal $-(V_e-V_l^*)$ of the operational amplifier 111 are added through input resistors $R_{24}$ and $R_{25}$, and the resultant signal is applied to the inverted input terminal $(-)$ of another operational amplifier 112. The non-inverted input terminal $(+)$ of the operational amplifier 112 is grounded through a grounding resistor $R_{38}$, and a diode $D_1$ is connected between the inverted input terminal $(-)$ and the output terminal of the operational amplifier 112. The output terminal of the operational amplifier 112 is connected to the anode of a diode $D_2$ whose cathode is connected through a feedback resistor $R_{26}$ to the inverted input terminal $(-)$ of the operational amplifier 112. The output signal $V_1$ of the operational amplifier 112 appearing through the diode $D_2$ is applied through a resistor $R_{33}$ to the inverted input terminal $(-)$ of another operational amplifier 115.

On the other hand, the detected voltage signal $V_e$ is added through resistors $R_{27}$ and $R_{28}$ to a limiter level setting $+V_l$ set in another potentiometer $VR_2$, and the resultant signal is applied to the inverted input terminal $(-)$ of another operational amplifier 113. The non-inverted input terminal $(+)$ of the operational amplifier 113 is grounded through a grounding resistor $R_{39}$, and a feedback resistor $R_{29}$ is connected between the inverted input terminal $(-)$ and the output terminal of the operational amplifier 113. The voltage command signal $V^*$ and the output signal $-(V_e+V_l^*)$ of the operational amplifier 113 are added through input resistors $R_{30}$ and $R_{31}$, and the resultant signal is applied to the inverted input terminal $(-)$ of another operational amplifier 114. The non-inverted input terminal $(+)$ of the operational amplifier 114 is grounded through a grounding resistor $R_{40}$, and a diode $D_3$ is connected between the inverted input terminal $(-)$ and the output terminal of the operational amplifier 114. The output terminal of the operational amplifier 114 is connected to the cathode of a diode $D_4$ whose anode is connected through a feedback resistor $R_{32}$ to the inverted input terminal $(-)$ of the operational amplifier 114. The output signal $V_2$ of the operational amplifier 114 appearing through the diode $D_4$ is applied through a resistor $R_{35}$ to the inverted input terminal $(-)$ of the operational amplifier 115. The operational amplifier 115 adds the signals $V^*$, $V_1$ and $V_2$ applied to its inverted input negative terminal $(-)$ through the input resistors $R_{33}$, $R_{34}$ and $R_{35}$. The non-inverted input terminal $(+)$ of the operational amplifier 115 is grounded through a grounding resistor $R_{41}$, and a feedback resistor $R_{36}$ is connected between the inverted input terminal $(-)$ and the output terminal of the operational amplifier 115. The output signal of the operational amplifier 115 is applied through an input resistor $R_{42}$ to the inverted input terminal $(-)$ of another operational amplifier 116 and is thus inverted in its polarity. The non-inverted input terminal $(+)$ of the operational amplifier 116 is grounded through a grounding resistor $R_{44}$, and a feedback resistor $R_{43}$ is connected between the inverted input terminal $(-)$ and the output terminal of the operational amplifier 116.

Figure 20:
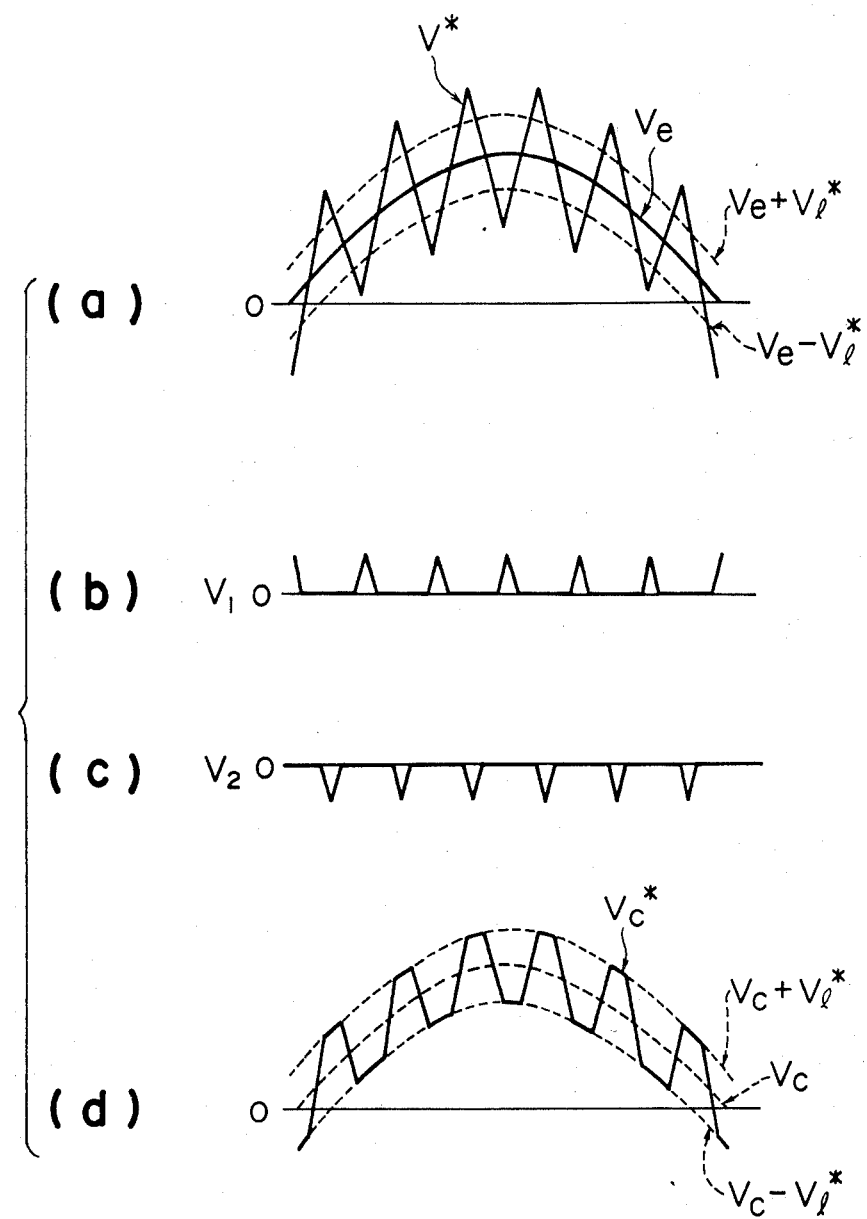
FIGS. 20 and 21 are the waveform diagrams illustrating the operation of the embodiment shown in FIG. 19.
Figure 21:
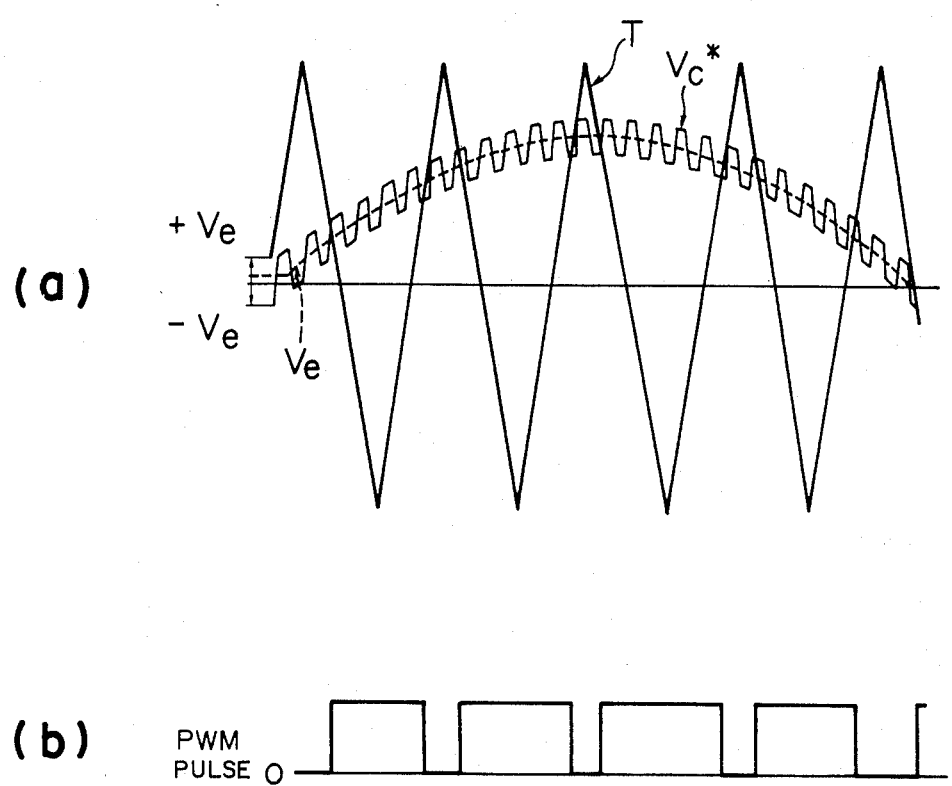

The operation of the embodiment shown in FIG. 18 will be described with reference to FIGS. 20 and 21, with emphasis being placed on the operation of the limiter circuit 81.

The fundamental wave component of the voltage command signal $V^*$ is the same as the detected voltage signal $V_e$ generated from the voltage detection circuit 72 when the voltage drop in the AC motor 2 due to the leakage impedance is ignored. The voltage command signal $V^*$, detected voltage signal $V_e$, signal $(V_e-V_l^*)$ applied to the operational amplifier 112 and signal $(V_e+V_l^*)$ applied to the operational amplifier 114 have waveforms as shown in FIG. 20(a). The operational amplifier 112 acts as a half-wave rectifier after computing the sum $-V^*+(V_e-V_l^*)$ thereby generating the signal V1 having a waveform as shown in FIG. 20(b). On the other hand, the operational amplifier 114 acts as a half-wave rectifier after computing the sum $-V^*+(V_e+V_l^*)$, thereby generating the signal $V_2$ having a waveform as shown in FIG. 20(c). The voltage command signal $V^*$ is added to the signals $V_1$ and $V_2$ in the operational amplifier 115, and the resultant signal is applied in an inverted polarity to the operational amplifier 116. Consequently, the compensated voltage command signal $V_c^*$ having a waveform as shown in FIG. 20(d) is generated from the operational amplifier 116.

This signal $V_c^*$ is limited by the limiter level settings $+V_l^*$ and satisfies the following relation:

$$V_e - V_l^* \leq V_c^* \leq V_e + V_l^* \tag{7}$$

The relation between the carrier wave signal T and the compensated voltage command signal $V_c^*$ including decreased ripple components as shown in FIG. 20(d) is as shown in FIG. 21(a), and a PWM pulse signal as shown in FIG. 21(b) is obtained.

Thus, in the embodiment shown in FIG. 18 too, ripple components included in the compensated voltage command signal $V_c^*$ can be sufficiently decreased so that the level of noise generated from the AC motor 2 during rotation at low speeds can be lowered.

While the above description has referred to embodiments composed of analog circuits, it is apparent that the present invention is equally effectively applicable to digital control of the PWM inverter using means such as a microprocessor.

Figure 22A:
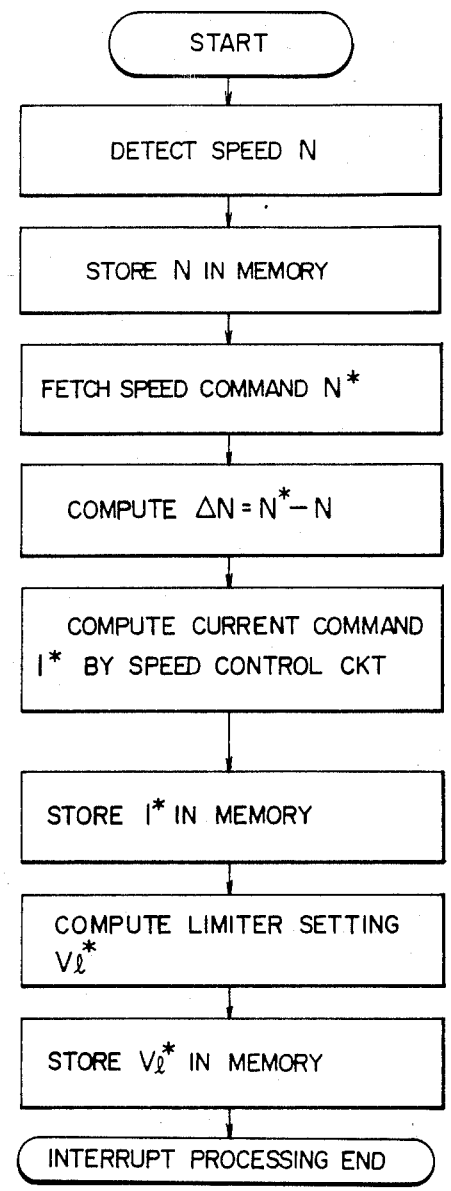
FIGS. 22a and 22b are flow charts of execution of the programmed operation of the embodiment shown in FIG. 1 under control of a microprocessor.
Figure 22B:
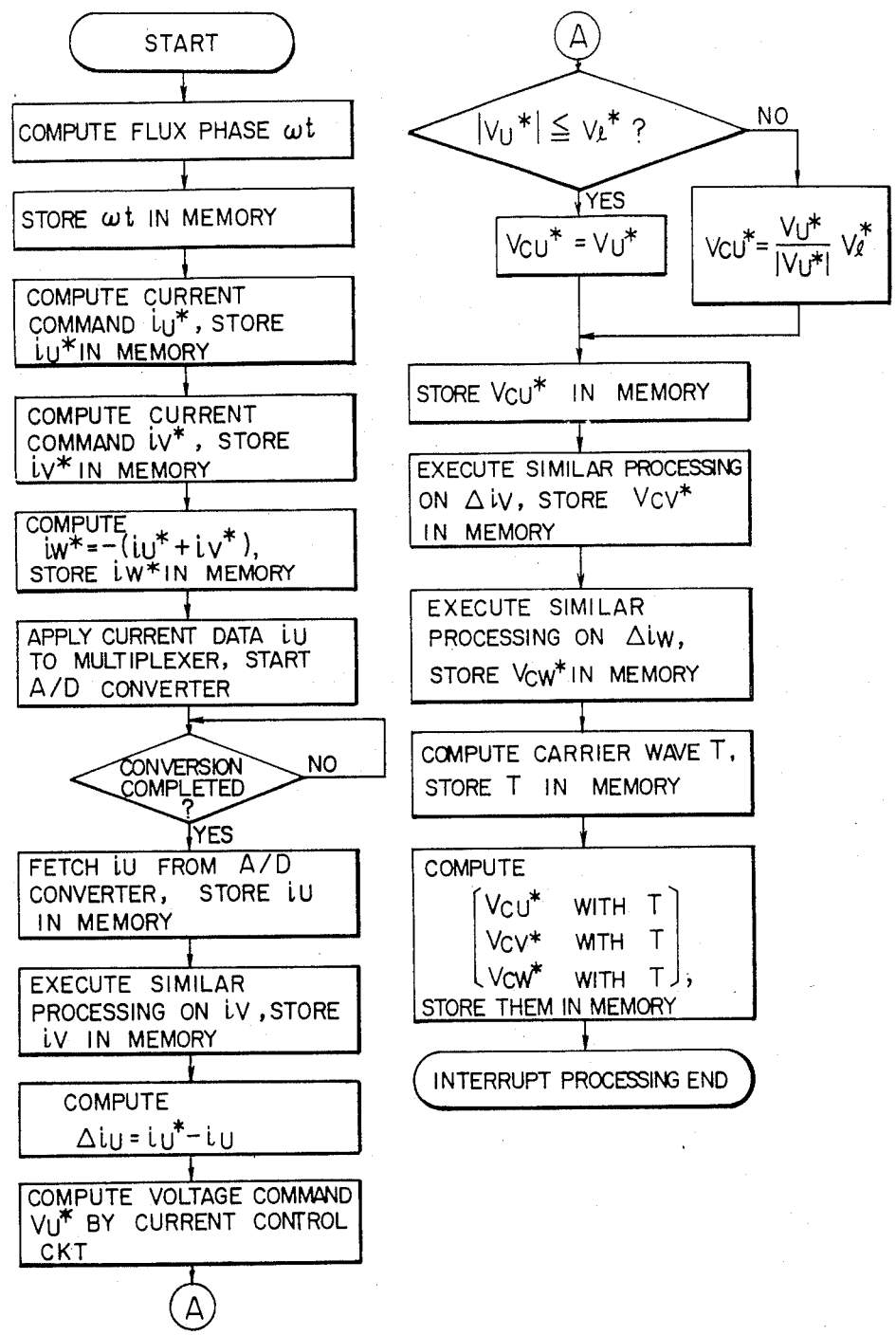

FIGS. 22a and 22b are flow charts of programmed operation of the embodiment shown in FIG. 1. It is apparent that the illustrated processing can be similarly executed in the other embodiments too.

It will be understood from the foregoing detailed description of the present invention that the amplitude of ripple components included in the voltage command signal is decreased with the decrease of the rotation speed of an AC motor to decrease the number of times of switching of switching elements thereby reducing the level of noise. According to the present invention, therefore, the noise level can be reduced regardless of the loaded operating condition of the AC motor, and the speed control with a high response can be achieved.

We claim:

1. A method for controlling a PWM inverter for driving an AC motor comprising the steps of preparing a speed command signal representing a desired speed of AC motor; comparing said speed command signal with a signal indicative of the detected speed of said motor for producing a current command signal; producing a voltage command signal whose amplitude is a function of the difference between the current command signal and a current signal representing a detected current in each phase of said AC motor while suppressing ripples included in said voltage command signal in each phase to a level which decreases with a decrease of the rotation speed of said AC motor; and producing a PWM pulse signal controlling the PWM inverter by comparing said voltage command signal with a carrier wave signal.

2. A PWM inverter control method as claimed in claim 1, including changing a limiter level setting of a limiter circuit used for providing said voltage command signal on the basis of the difference between said current command signal and said detected current signal in each phase in proportion to the rotation speed of said AC motor for the suppression of the ripples included in said voltage command signal for each phase.

3. A PWM inverter control method as claimed in claim 1, including changing a limiter level setting of a limiter circuit used for providing said command voltage signal on the basis of the difference between said current command signal and said detected current signal in each phase in proportion to the rotation speed of said AC motor, and changing the amplitude of said carrier wave signal generated from an oscillator so as to decrease with an increase of the rotation speed of said AC motor, for the suppression of the ripples included in said voltage command signal for each phase.

4. A PWM inverter control method as claimed in claim 2, including changing said limiter setting in proportion to the magnitude of the motor voltage in each phase of said AC motor.

5. A PWM inverter control method as claimed in claim 3, including changes said limiter level setting in proportion to the magnitude of the motor voltage in each phase of said AC motor.

6. A PWM inverter control method as claimed in claim 1, including detecting the voltage at the neutral point of said AC motor and adding the detected neutral voltage signal in a negative feedback fashion to said current command signal in each phase, for the suppression of the ripples included in said voltage command signal for each phase.

7. A PWM inverter control method, as claimed in claim 6, including obtaining said neutral voltage by addition of the sinusoidal voltage command signals of the individual phases in an adder.

8. A PWM inverter control method as claimed in claim 1, including smoothing said voltage command signal in each phase by smoothing means, and decreasing the time constant of said smoothing means with an increase of the rotation speed of said AC motor, for the suppression of the ripples included in said voltage command signal for each phase.

9. A PWM inverter, control method as claimed in claim 1, including detecting the terminal in each phase of said AC motor is detected by voltage detecting means, and the voltage signal detected by said voltage detecting means is added in an adder to said voltage command signal in each phase, for the suppression of the ripples included in said voltage command signal for each phase.

10. A PWM inverter control method as claimed in claim 1, wherein the step of suppressing the ripples includes changing a limiter level for limiting the amplitude of a ripple component contained in the voltage command signal in proportion to a detected voltage applied to the AC motor.

11. An apparatus for controlling a PWM inverter comprising a PWM inverter driving an AC motor, a current control circuit generating a voltage command signal whose amplitude is variable depending on the error between a current command signal commanding the current of said PWM inverter and a detected current signal indicative of the detected current of said PWM inverter in each of the individual phases, pulse generating means receiving said voltage command signal as a modulation signal and generating a PWM pulse signal controlling said PWM inverter as a result of comparison between the modulation signal and a carrier wave signal for each phase, and ripple suppressing means for decreasing the amplitude of ripples included in said voltage command signal in each phase with the decrease of the rotation speed of said AC motor.

12. A PWM inverter control apparatus as claimed in claim 10, wherein said ripple suppressing means includes limiter level adjusting means for changing the limiter level setting of a limiter circuit connected to said current control circuit in proportion to the rotation speed of said AC motor.

13. A PWM inverter control apparatus as claimed in claim 10, wherein said ripple suppressing means includes limiter level adjusting means for changing the limiter level setting of a limiter circuit connected to said current control circuit in proportion to the rotation speed of said AC motor, and carrier amplitude adjusting means for changing the amplitude of said carrier wave signal so as to decrease with an increase of rotation speed of said AC motor.

14. A PWM inverter control apparatus as claimed in claim 12, wherein said limiter level adjusting means includes means for changing the limiter level setting in proportion to the motor voltage in each phase of said AC motor.

15. A PWM inverter control apparatus as claimed in claim 12, wherein said limiter level adjusting means includes means for changing the limiter level setting in proportion to the motor voltage in each phase of said AC motor.

16. A PWM inverter control apparatus as claimed in claim 11, wherein said ripple suppressing means includes neutral voltage detecting means for detecting the voltage at the neutral point of said AC motor and adding the detected neutral voltage signal in a negative feedback fashion to said current command signal in each phase.

17. A PWM inverter control apparatus as claimed in claim 11, wherein said ripple suppressing means includes smoothing means for smoothing said voltage command signal in each phase, and time constant adjusting means for decreasing the time constant of said smoothing means with an increase of the rotation speed of said AC motor.

18. A PWM inverter control apparatus as claimed in claim 11, wherein said ripple suppressing means includes voltage detecting means for detecting the terminal voltage in each phase of said AC motor, and adder means for adding the voltage signal detected by said voltage detecting means to said voltage command signal for each phase.

19. A PWM inverter control apparatus as claimed in claim 10, wherein said ripple suppressing means includes limiter means for limiting the amplitude of a ripple component contained in the voltage command signal to a predetermined level, and means for changing said predetermined level in proportion to a detected voltage applied to the AC motor.

* * * * *